United States Patent
Minezaki et al.

(10) Patent No.: US 9,030,762 B2
(45) Date of Patent: May 12, 2015

(54) POLYESTER RESIN AND OPTICAL LENS

(75) Inventors: Takuya Minezaki, Kanagawa (JP); Takeshi Hirokane, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 58 days.

(21) Appl. No.: 13/988,404

(22) PCT Filed: Dec. 7, 2011

(86) PCT No.: PCT/JP2011/078254
§ 371 (c)(1),
(2), (4) Date: Aug. 12, 2013

(87) PCT Pub. No.: WO2012/077700
PCT Pub. Date: Jun. 14, 2012

(65) Prior Publication Data
US 2013/0321934 A1    Dec. 5, 2013

(30) Foreign Application Priority Data
Dec. 10, 2010  (JP) ................................ 2010-276297

(51) Int. Cl.
*G02B 3/02* (2006.01)
*C08L 31/00* (2006.01)
*B29D 11/00* (2006.01)
*C08G 63/189* (2006.01)
*C08G 63/199* (2006.01)
*C08L 67/02* (2006.01)
*G02B 1/04* (2006.01)

(52) U.S. Cl.
CPC .............. *G02B 1/041* (2013.01); *C08G 63/189* (2013.01); *C08G 63/199* (2013.01); *C08L 67/02* (2013.01)

(58) Field of Classification Search
USPC ............... 359/717, 642; 525/94, 418, 419; 264/1.1, 1.32; 425/808
See application file for complete search history.

(56) References Cited

U.S. PATENT DOCUMENTS

| | | | |
|---|---|---|---|
| 3,345,329 A | 10/1967 | Sommer et al. | |
| 7,179,869 B2 * | 2/2007 | Hirokane et al. | 525/444 |
| 8,233,225 B2 | 7/2012 | Hirokane et al. | |
| 2008/0023887 A1 * | 1/2008 | Vollenberg et al. | 264/500 |
| 2008/0027167 A1 * | 1/2008 | Vollenberg et al. | 524/505 |
| 2011/0109980 A1 * | 5/2011 | Hirokane et al. | 359/796 |
| 2012/0289676 A1 | 11/2012 | Minezaki et al. | |

FOREIGN PATENT DOCUMENTS

| | | |
|---|---|---|
| JP | 6-37548 | 2/1994 |
| JP | 2000-353312 | 12/2000 |
| JP | 2001-64371 | 3/2001 |
| JP | 2006-335974 | 12/2006 |
| JP | 2007-161917 | 6/2007 |
| JP | 2007-224281 | 9/2007 |
| WO | 2010/004965 | 1/2010 |

OTHER PUBLICATIONS

International Search Report issued in PCT/JP2011/078254 on Mar. 13, 2012.

* cited by examiner

*Primary Examiner* — Evelyn A. Lester
(74) *Attorney, Agent, or Firm* — Greenblum & Bernstein, P.L.C.

(57) ABSTRACT

The present invention relates to a polyester resin including a diol constitutional unit and a dicarboxylic acid constitutional unit as main constitutional units, in which the diol constitutional unit contains from 70 to 95% by mol of a constitutional unit derived from ethylene glycol and from 5 to 30% by mol of a constitutional unit derived from tricyclodecane dimethanol or pentacyclopentadecane dimethanol, and the dicarboxylic acid constitutional unit contains 50% by mol or more of a constitutional unit derived from a naphthalenedicarboxylic acid, and an optical lens obtained by molding the polyester resin. According to the present invention, there are provided a polyester resin that has a high refractive index and a low Abbe number and can be molded into a good optical lens, and an optical lens obtained by molding the polyester resin.

15 Claims, No Drawings

POLYESTER RESIN AND OPTICAL LENS

TECHNICAL FIELD

The present invention relates to a polyester resin containing a constitutional unit derived from a specific glycol, and more particularly, to a polyester resin capable of exhibiting excellent properties when used as a material for an optical lens. The present invention also relates to an optical lens obtained by molding the polyester resin.

BACKGROUND ART

Optical glass or an optical transparent resin is used as a material for an optical device used in an optical system of various kinds of cameras, such as a camera, a one-time use camera and a video camera. Optical glass is excellent in heat resistance, transparency, dimensional stability, chemical resistance and the like, and includes various materials having various refractive indices and Abbe numbers, but has problems of high material cost, poor molding workability and low productivity. In particular, formation of an aspherical lens used for aberration correction requires extremely high technique and high cost, which result in a significant barrier on practical use.

In comparison with the above optical glass, an optical lens formed of an optical transparent resin, particularly a thermoplastic transparent resin, has such advantages that the lens can be mass-produced by injection molding and also can be formed easily into an aspherical lens, and thus the lens is currently applied to a lens for a camera. Examples of the resin include polycarbonate containing bisphenol A as a constitutional unit, polymethyl methacrylate and amorphous polyolefin.

In general, aberration of an optical system of a camera is corrected by the combination use of a plurality of convex lenses and concave lenses. Specifically, a chromatic aberration formed by a convex lens and a chromatic aberration of a concave lens that is opposite in sign to that of the convex lens are combined to negate the chromatic aberration. In this case, the concave lens is required to have a high dispersion (i.e., a low Abbe number).

In view of a high dispersion (low Abbe number) of the aforementioned optical thermoplastic resins, polycarbonate containing bisphenol A as a constitutional unit has a refractive index of approximately 1.59 and an Abbe number of approximately 32, polymethyl methacrylate has a refractive index of approximately 1.49 and an Abbe number of approximately 58, and amorphous polyolefin has a refractive index of approximately 1.54 and an Abbe number of approximately 56. Only polycarbonate may be used as a concave lens for aberration correction, but its Abbe number of 32 does not be considered to be sufficient to attain a high dispersion. Therefore, there is an increasing demand for a novel material that can be used as the concave lens for aberration correction.

Patent Document 1 discloses a polyester resin composition formed by copolymerization of a fluorene dihydroxy compound having a refractive index of 1.66 and an Abbe number of approximately 20 as a resin for use as a concave lens for aberration correction. The resin has a sufficiently large dispersion (i.e., a low Abbe number) but has the following defects as a resin for an optical lens. That is, the resin is formed by copolymerization of a large amount of a fluorene dihydroxy compound, which is bulky and rigid, and thus the resin has a considerably high melt viscosity and is poor in moldability. As a measure for improving the moldability, the melt viscosity upon molding may be lowered, i.e., the molding temperature may be increased, but the measure may cause such problems that coloration upon molding is intensified, and the mold is contaminated with thermal decomposition products. There is also considered such a measure that the melt viscosity is lowered by decreasing the polymerization degree, but the case involves such problems that the content of low molecular weight components in the resin is relatively increased to contaminate the mold with the low molecular weight components or decomposition products of the low molecular weight components. Thus, Patent Document 1 has failed to propose an optical lens formed of a thermoplastic resin that has both excellent optical characteristics (i.e., a high refractive index and a low Abbe number) and practically sufficient moldability.

Meanwhile, there is known a polyester produced from a naphthalenedicarboxylic acid and an aliphatic polycyclic diol. Patent Document 2 discloses a polyester produced from a naphthalenedicarboxylic acid, tricyclodecane dimethylol and ethylene glycol, which exhibits a high glass transition temperature, a high surface hardness, an excellent impact strength and an excellent transparency. In addition, Patent Document 3 also discloses a polyester produced from a naphthalenedicarboxylic acid, tricyclodecane dimethylol and ethylene glycol. However, in Patent Document 2, no study on optical applications of the polyester is made, and no optical properties of the polyester are described. On the other hand, in Patent Document 3, although there are described a refractive index and an Abbe number of the polyester, the polyester has an Abbe number as high as 26 or more and therefore fails to exhibit a sufficiently large dispersion (i.e., low Abbe number).

Patent Document 4 discloses the use of a polyester resin containing a unit derived from ethylene glycol, a unit derived from a diol having from 3 to 16 carbon atoms and a unit derived from a naphthalenedicarboxylic acid. However, it has been required that the polyester is further improved in moldability including a thermal stability or the like. Patent Document 4 also fails to describe a concrete example concerning the use of combination of the unit derived from a diol having from 3 to 16 carbon atoms such as tricyclodecane dimethanol and pentacyclopentadecane dimethanol with the other unit.

CITATION LIST

Patent Literature

Patent Document 1: JP 2006-335974A
Patent Document 2: U.S. Pat. No. 3,345,329B
Patent Document 3: JP 6-37548B
Patent Document 4: WO 2010/004965A

SUMMARY OF INVENTION

Technical Problem

In view of the aforementioned problems, an object of the present invention is to provide a polyester resin that has a high refractive index and a low Abbe number and can be molded into a good optical lens, and an optical lens obtained by molding the polyester resin.

Solution to Problem

As a result of extensive and intensive researches, the present inventors have found that a polyester resin containing a constitutional unit derived from a specific glycol is capable of exhibiting excellent properties, in particular, when used as a material for an optical lens. That is, the present invention relates to the following aspects.

1. A polyester resin including a diol constitutional unit and a dicarboxylic acid constitutional unit as main constitutional units, the diol constitutional unit containing from 70 to 95% by mol of a constitutional unit derived from ethylene glycol and from 5 to 30% by mol of a constitutional unit derived from tricyclodecane dimethanol or pentacyclopentadecane dimethanol, and the dicarboxylic acid constitutional unit containing 50% by mol or more of a constitutional unit derived from a naphthalenedicarboxylic acid.

2. An optical lens obtained by molding the polyester resin as described in the above aspect 1.

3. An optical lens system including a combination of the optical lens as described in the above aspect 2, and another optical lens.

Advantageous Effects of Invention

The polyester resin of the present invention is a useful resin having a high refractive index, a low Abbe number and a low birefringence, and is capable of being injection-molded and exhibiting a high thermal stability. For these reasons, the polyester resin of the present invention can provide a lens with a high productivity as compared to those lenses obtained from conventional glass materials. In addition, the optical lens of the present invention is considerably useful since an aspherical lens having a high refractive index and a low birefringence which has been technically difficult to produce from a glass lens, can be obtained by injection molding in a simple and convenient manner.

DESCRIPTION OF EMBODIMENTS

The polyester resin of the present invention includes a diol constitutional unit and a dicarboxylic acid constitutional unit as main constitutional units, in which the diol constitutional unit contains from 70 to 95% by mol of a constitutional unit derived from ethylene glycol and from 5 to 30% by mol of a constitutional unit derived from tricyclodecane dimethanol or pentacyclopentadecane dimethanol, and the dicarboxylic acid constitutional unit contains 50% by mol or more of a constitutional unit derived from a naphthalenedicarboxylic acid.

The total content of the diol constitutional unit and the dicarboxylic acid constitutional unit in whole constitutional units of the polyester resin is preferably 80% by mol or more, more preferably 90% by mol or more and most preferably 100% by mol.

Further, in view of various properties of the polyester resin, the content of the constitutional unit derived from ethylene glycol in the diol constitutional unit is preferably from 80 to 95% by mol and more preferably from 85 to 90% by mol, and the content of the constitutional unit derived from tricyclodecane dimethanol or pentacyclopentadecane dimethanol in the diol constitutional unit is preferably from 5 to 20% by mol and more preferably from 10 to 15% by mol. In the polyester resin according to the present invention, the constitutional unit derived from tricyclodecane dimethanol or pentacyclopentadecane dimethanol is preferably a constitutional unit derived from tricyclodecane dimethanol.

The above tricyclodecane dimethanol is preferably a compound represented by the following formula (i), and the pentacyclopentadecane dimethanol is preferably a compound represented by the following formula (ii) or (iii).

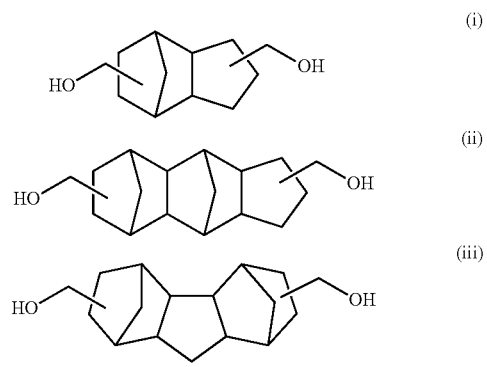

Examples of the compound represented by the above formula (i) include 3,8-bis(hydroxymethyl)tricyclo[5.2.1.0$^{2-6}$]decane, 3,9-bis(hydroxymethyl)tricyclo[5.2.1.0$^{2-6}$]decane, 4,8-bis(hydroxymethyl)tricyclo[5.2.1.0$^{2-6}$]decane, 4,9-bis(hydroxymethyl)tricyclo[5.2.1.0$^{2-6}$]decane, 5,8-bis(hydroxymethyl)tricyclo[5.2.1.0$^{2-6}$]decane and 5,9-bis(hydroxymethyl)tricyclo[5.2.1.0$^{2-6}$]decane. These tricyclodecane dimethanol compounds may be used alone or in combination of any two or more thereof.

Examples of the compound represented by the above formula (ii) include 4,10-bis(hydroxymethyl)pentacyclo[6.5.1.1$^{3-6}$.0$^{2-7}$.0$^{9-13}$]pentadecane, 4,11-bis(hydroxymethyl)pentacyclo[6.5.1.1$^{3-6}$.0$^{2-7}$.0$^{9-13}$]pentadecane, 4,12-bis(hydroxymethyl)pentacyclo[6.5.1.1$^{3-6}$.0$^{2-7}$.0$^{9-13}$]pentadecane, 5,10-bis(hydroxymethyl)pentacyclo[6.5.1.1$^{3-6}$.0$^{2-7}$.0$^{9-13}$]pentadecane, 5,11-bis(hydroxymethyl)pentacyclo[6.5.1.1$^{3-6}$.0$^{2-7}$.0$^{9-13}$]pentadecane and 5,12-bis(hydroxymethyl)pentacyclo[6.5.1.1$^{3-6}$.0$^{2-7}$.0$^{9-13}$]pentadecane. Examples of the compound represented by the above formula (iii) include 5,12-bis(hydroxymethyl)pentacyclo[9.2.1.1$^{4-7}$.0$^{2-10}$.0$^{3-8}$]pentadecane, 5,13-bis(hydroxymethyl)pentacyclo[9.2.1.1$^{4-7}$.0$^{2-10}$.0$^{3-8}$]pentadecane, 6,12-bis(hydroxymethyl)pentacyclo[9.2.1.1$^{4-7}$.0$^{2-10}$.0$^{3-8}$]pentadecane and 6,13-bis(hydroxymethyl)pentacyclo[9.2.1.1$^{4-7}$.0$^{2-10}$.0$^{3-8}$]pentadecane.

These pentacyclopentadecane dimethanol compounds may be used alone or in combination of any two or more thereof.

In the polyester resin according to the present invention, the dicarboxylic acid constitutional unit contains the constitutional unit derived from a naphthalenedicarboxylic acid in an amount of 50% by mol or more, preferably 80% by mol or more, and more preferably 90% by mol or more. When the content of the constitutional unit derived from a naphthalenedicarboxylic acid in the dicarboxylic acid constitutional unit lies within the above-specified range, the resulting polyester resin according to the present invention exhibits a high refractive index and a low Abbe number and therefore can be suitably used as a material for an optical lens. Examples of the constitutional unit derived from a naphthalenedicarboxylic acid include constitutional units derived from 1,3-naphthalenedicarboxylic acid, 1,4-naphthalenedicarboxylic acid, 1,5-naphthalenedicarboxylic acid, 2,6-naphthalenedicarboxylic acid and 2,7-naphthalenedicarboxylic acid. Among these constitutional units, the constitutional unit derived from 2,6-naphthalenedicarboxylic acid is particularly preferred from the standpoint of refractive index, Abbe number, heat resistance, mechanical capability and economy.

In the polyester resin according to the present invention, the content of the constitutional unit derived from an aromatic dicarboxylic acid in the dicarboxylic acid constitutional unit is preferably from 80 to 100% by mol, more preferably from 90 to 100% by mol and most preferably 100% by mol.

In the polyester resin according to the present invention, the dicarboxylic acid constitutional unit may also contain a constitutional unit derived from the other dicarboxylic acid in addition to the constitutional unit derived from a naphthalenedicarboxylic acid. Examples of the constitutional unit derived from the other dicarboxylic acid include constitutional units derived from an aromatic dicarboxylic acid such as terephthalic acid, isophthalic acid, phthalic acid, 2-methylterephthalic acid, biphenyldicarboxylic acid and tetralindicarboxylic acid; and constitutional units derived from an aliphatic dicarboxylic acid such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane and a dimer acid. The dicarboxylic acid constitutional unit for the polyester resin according to the present invention may be constituted by a single kind or may be constituted by two or more kinds.

The polyester resin may contain a monoalcohol constitutional unit, such as butyl alcohol, hexyl alcohol and octyl alcohol, a trihydric or higher polyhydric alcohol constitutional unit, such as trimethylolpropane, glycerin, 1,3,5-pentanetriol and pentaerythritol, a monocarboxylic acid constitutional unit, such as benzoic acid, propionic acid and butyric acid, a polybasic carboxylic acid constitutional unit, such as trimellitic acid and pyromellitic acid, an oxyacid constitutional unit, such as glycolic acid, lactic acid, hydroxybutyric acid, 2-hydroxyisobutyric acid and hydroxybenzoic acid, for controlling the melt viscoelasticity and the molecular weight of the polyester resin, in such a range that does not impair the advantages of the present invention.

In view of application of the polyester resin to an optical lens, in particular, a concave lens for aberration correction, the polyester resin according to the present invention usually has a refractive index of 1.60 or more, preferably 1.63 or more, and more preferably 1.64 or more. The upper limit of the refractive index of the polyester resin is not particularly limited, and is preferably 1.7 or less in view of a good balance between the refractive index and other properties. In addition, the polyester resin according to the present invention has an Abbe number of 25 or less, preferably 21 or less, and more preferably 20 or less. The lower limit of the Abbe number of the polyester resin is not particularly limited, and is preferably 18 or more in view of a good balance between the Abbe number and other properties. By controlling the constitutional units of the polyester resin and the contents thereof as described above, it is possible to readily adjust the refractive index and the Abbe number of the polyester resin to the desired values.

The refractive index and the Abbe number of the polyester resin may be measured by the following methods. That is, an injection-molded piece of the polyester resin is subjected to annealing treatment in an oven maintained at a temperature lower by about 20° C. than a glass transition temperature of the polyester resin for 10 h to prepare a specimen to be measured. Meanwhile, the refractive index is the value measured at 589 nm (d line), and the Abbe number is the value calculated from refractive indices measured at 656 nm (C line), 486 nm (F line) and the d line.

The polyester resin according to the present invention preferably has a refractive index of 1.60 or more and an Abbe number of 21 or less as measured by the above methods.

The polyester resin according to the present invention usually has a glass transition temperature of 110° C. or higher, preferably 115° C. or higher and more preferably 120° C. or higher as measured using a differential scanning calorimeter, although not particularly limited thereto. In the case where the glass transition temperature of the polyester resin lies in the above-specified range, the optical lens of the present invention can sufficiently withstand a surface treatment, such as hard-coating. The glass transition temperature of the polyester resin can be easily controlled to 110° C. or higher by appropriately selecting a diol having a cyclic acetal skeleton or an aromatic hydrocarbon group and a dicarboxylic acid having a naphthalene skeleton, etc., from conventionally known diols and dicarboxylic acids.

The intrinsic viscosity (IV) of the polyester resin according to the present invention is not particularly limited, and is preferably from 0.20 to 1.2 dL/g as measured at 25° C. in a mixed solvent containing phenol and 1,1,2,2-tetrachloroethane at a mass ratio of 6:4 in consideration of selecting an injection molding as a molding method of the optical lens or sufficient exhibition of the mechanical capability of the optical lens. The intrinsic viscosity (IV) of the polyester resin according to the present invention is more preferably from 0.20 to 1.0 dL/g, still more preferably from 0.25 to 0.50 dL/g, and further still more preferably from 0.30 to 0.50 dL/g in consideration of prevention of exhibition of birefringence upon molding.

In the case where the intrinsic viscosity lies in the above-specified range, the polyester resin according to the present invention is excellent in balance among moldability, mechanical capability and low birefringence. In the case where the intrinsic viscosity exceeds the upper limit value of the range, exhibition of birefringence may not be prevented upon molding, which may unfavorably result in an optical lens having a large birefringence. In the case where the intrinsic viscosity is lower than the lower limit value, the mechanical capability of the optical lens may not be unfavorably sufficiently exhibited.

The half crystallization time of the polyester resin used in the present invention is preferably 30 min or longer, more preferably 70 min or longer, and still more preferably 90 min or longer as measured by the below-mentioned method. When the half crystallization time of the polyester resin is shorter than 30 min, the polyester resin tends to suffer from accelerated crystallization in a mold upon forming the polyester resin into a lens shape by injection molding, so that the resulting molded piece tends to suffer from whitening or occurrence of white turbidity, which may result in deterioration in total light transmittance and unfavorably increase in haze.

The upper limit of the half crystallization time of the polyester resin according to the present invention is not particularly limited, and may be generally in the range of 100 min or shorter.

The polyester resin according to the present invention preferably satisfies the following properties (1) and (2):
(1) a mid-point glass transition temperature of 120° C. or higher as measured by a method for measuring a transition temperature of plastics according to JIS K7121; and
(2) an intrinsic viscosity (IV) of from 0.2 to 1.0 dL/g as measured at 25° C. in a mixed solvent containing phenol and 1,1,2,2-tetrachloroethane at a mass ratio of 6:4.

A method for producing the polyester resin according to the present invention is not particularly limited, and a known production method for polyester may be applied. Examples of the method include a melt polymerization method, such as a transesterification method and a direct esterification method, and a solution polymerization method, and a transesterification method is particularly preferred. Catalysts, such as a transesterification catalyst, an esterification catalyst and a polycondensation catalyst, stabilizers, such as an etherification preventing agent, a thermal stabilizer and a light stabilizer, a polymerization controlling agent and the like, which are usable upon production of the polyester resin, may be known materials. These materials may be appropriately selected depending on the reaction rate and the color, safety, thermal stability, weather resistance, elution property and the like of the polyester resin. Examples of the catalysts include a compound of a metal, such as zinc, lead, cerium, cadmium, manganese, cobalt, lithium, sodium, potassium, calcium, nickel, magnesium, vanadium, aluminum, titanium, antimony and tin (for example, a fatty acid salt, a carbonate salt, a phosphate salt, a hydroxide, a chloride, an oxide and an alkoxide), and metallic magnesium, which may be used solely or as a combination of plural kinds thereof. The amount of the transesterification catalyst used in the transesterification method is preferably from 0.001 to 1% by mol, and more preferably from 0.005 to 0.5% by mol, on the basis of the dicarboxylic acid unit, and a compound of manganese among the aforementioned catalysts is particularly preferred as the transesterification catalyst. The amount of the polycondensation catalyst used is preferably from 0.001 to 1% by mol, and more preferably from 0.005 to 0.5% by mol, on the basis of the dicarboxylic acid unit, and a compound of antimony among the aforementioned catalysts is particularly preferred as the polycondensation catalyst.

The polyester resin according to the present invention may contain an additional resin, various additives, such as an antioxidant, a light stabilizer, an ultraviolet ray absorbent, a plasticizer, an extender, a matting agent, a drying controlling agent, an antistatic agent, a sedimentation preventing agent, a surfactant, a flow improver, a drying oil, a wax, a filler, a colorant, a reinforcing agent, a surface smoothing agent, a leveling agent, a curing reaction accelerator and a thickening agent, and a molding assistant. As a flow improver, an ester of a polyfunctional alcohol and a fatty acid, particularly an ester of stearic acid and glycerin, may be added in an amount of 5,000 ppm or less and preferably 3,000 ppm or less, thereby favorably preventing problems caused by failure upon releasing the resin from a mold.

The content of foreign matters in the polyester resin of the present invention is preferably as small as possible, and such an operation as filtration of the molten raw materials, filtration of the catalyst liquid and filtration of the molten oligomer is preferably performed. The filter used preferably has a mesh size of 7 μm or less, and more preferably 5 μm or less. The resin thus formed is still more preferably filtered with a polymer filter. The polymer filter used preferably has a mesh size of 100 μm or less, and more preferably 30 μm or less. The operation of collecting the resin pellets must be performed in a low-dust environment, which is preferably a class 1000 or less clean room, and more preferably a class 100 or less clean room.

The polyester resin of the present invention may be used in various applications including, for example, an injection-molded article, an extrusion-molded articles such as a sheet, a film and a pipe, a bottle, an expanded article, an adhesive material, a bonding agent, a coating material, etc. More specifically, the sheet may have either a single layer structure or a multi-layer structure. The film may also have either a single layer structure or a multi-layer structure, or may be either unstretched or monoaxially or biaxially stretched. Further, the sheet or film may be laminated on a steel plate, etc. The bottle may be in the form of either a direct blow-molded bottle, an injection blow-molded bottle or an injection-molded bottle. The expanded article may be in the form of either expanded beads or an extrusion-expanded article. In particular, the polyester resin may be suitably used as an interior part used in automobiles, a packaging material for export and import package, an electronic material such as a back sheet for solar batteries, a food packaging material for retort treatment or heat treatment by electronic oven and the like in the applications requiring a high heat resistance or a high water vapor-barrier property.

The polyester resin according to the present invention may be injection-molded, in particular, into a lens shape using an injection molding machine or an injection compression molding machine to thereby obtain an excellent optical lens. In order to minimize inclusion of foreign matters in the optical lens upon formation of the optical lens, the environment where the resin is molded must be a low-dust environment, which is preferably a class 1000 or less clean room, and more preferably a class 100 or less clean room.

The optical lens obtained by molding the polyester resin of the present invention may be suitably practically used in the form of an aspherical lens according to requirements. The aspherical lens can substantially negate spherical aberration only with a single lens, thereby preventing plural spherical lenses from being used for negating spherical aberration, and therefore, reduction in weight and production cost can be achieved. Accordingly, the aspherical lens is particularly useful as a lens for a camera among optical lenses. The aspherical lens preferably has an astigmatism of from 0 to 15 mλ, and more preferably from 0 to 10 mλ.

The optical lens obtained by molding the polyester resin of the present invention may have on the surface thereof a coating layer, such as an antireflection layer and a hardcoat layer, if necessary. The antireflection layer may have a single layer structure or a multilayer structure and may be formed of an organic material or an inorganic material, and is preferably formed of an inorganic material. Specific examples of the inorganic material include an oxide and a fluoride, such as silicon oxide, aluminum oxide, zirconium oxide, titanium oxide, cerium oxide, magnesium oxide and magnesium fluoride.

The optical lens obtained by molding the polyester resin of the present invention may be applied to various lenses including a pick-up lens, an f-θ lens and a spectacle lens, and may be applied particularly preferably to a lens for correcting chromatic aberration in consideration of a high refractive index and a low Abbe number thereof. Specifically, the optical lens can be favorably applied to lenses of a single-lens reflex camera, a digital still camera, a video camera, a cell phone camera, a one-time use camera, a telescope, binoculars, a microscope and a projector. In the case where the optical lens of the present invention is a concave lens, an optical lens having a less chromatic aberration can be formed by combining the optical lens of the present invention with another convex lens having a high Abbe number. The Abbe number of the convex lens to be combined with the optical lens of the present invention is preferably from 40 to 60, and more preferably from 50 to 60.

EXAMPLES

The invention will be described in more detail with reference to Examples below, but the invention is not limited in scope thereof by these Examples.

The evaluation methods of the polyester resins and the optical lenses used in the following Examples, etc., are as follows.

<Evaluation Methods of Polyester Resin>

(1) Resin Composition

The ratios of the ethylene glycol constitutional unit, the other diol constitutional unit and the naphthalenedicarboxylic acid constitutional unit in the polyester resin were calculated from $^1$H-NMR measurement. The measurement apparatus used was "JNM-AL400" available from JEOL, Ltd., and the measurement is performed at 400 MHz. The solvent mainly used was deuterated chloroform and deutero-trifluoroacetic acid.

(2) Glass Transition Temperature (Tg)

The glass transition temperature of the polyester resin was measured using "DSC/TA-60WS" available from Shimadzu Corporation, in the following manner. Approximately 10 mg of the polyester resin placed in an aluminum unsealed vessel was heated to 280° C. at a temperature increasing rate of 20° C. per minute under a nitrogen stream (30 mL/min), and the molten resin was quenched to prepare a specimen to be measured. The specimen was measured under the same conditions, and the mid-point glass transition temperature was calculated from the measured values according to JIS K7121.

(3) Refractive Index and Abbe Number

The resulting polyester resin was dried under vacuum at a temperature lower by about 20° C. than a glass transition temperature of the polyester resin for 10 h and injection-molded using "SH50" available from Sumitomo Heavy Industries, Ltd., at a cylinder temperature of 280° C. and a mold temperature lower by 20 to 50° C. than the glass transition temperature of the polyester resin into an isosceles right triangular shape with an edge of 20 mm (thickness: 3 mm). The resulting molded piece was annealed in an oven maintained at a temperature lower by about 20° C. than the glass transition temperature of the polyester resin for 10 h to prepare a specimen to be measured. The specimen was measured for refractive index and Abbe number using a refractive index measuring apparatus available from Atago Co., Ltd. The refractive index was measured at 589 nm (d line), and the Abbe number was calculated from refractive indices measured at 656 nm (C line), 486 nm (F line) and the d line.

(4) Intrinsic Viscosity (IV)

The polyester resin was dissolved in a mixed solvent of phenol/tetrachloroethane at a weight ratio of 6/4, followed by allowing the resulting solution to stand at 25° C., and the intrinsic viscosity of the solution was measured using an Ubbellohde viscometer.

(5) Half Crystallization Time

The half crystallization time was measured using a crystallization rate measuring apparatus "WK-701" available from Hexa-Science Co., Ltd., in the following manner. The polyester resin was heat-pressed at 200° C. to prepare a film specimen having a thickness of 100 to 1000 μm. The resulting film specimen was sandwiched between two sheets of slide glass, and heated and melted at 300° C. for 3 min and then immersed in an oil bath at 180° C. Then, light having passed through a polarizing plate (polarizer) was transmitted through the specimen, and the transmitted light was then allowed to pass through a polarizing plate (analyzer) to measure and detect an amount of the passed light using a photo detector. The time until reaching a mid point between an amount of light upon initiation of the test and a minimum amount of the transmitted light was defined as a half crystallization time of the polyester resin. The half crystallization time exceeding 180 min was expressed by ">180".

<Evaluation Method of Optical Lens>

(1) Appearance Evaluation

The appearance of the optical lens was evaluated by observation with naked eyes.

Examples 1 to 7 and Comparative Examples 1 to 7

Raw material monomers shown in Table 1 were charged in a polyester producing apparatus equipped with a packed column type rectification column, a partial condenser, a total condenser, a cold trap, an agitator, a heating device and a nitrogen introducing tube or a glass flask equipped with a heating device, an agitator, a partial condenser, a trap, a thermometer and a nitrogen introducing tube, and transesterification reaction was performed in the presence of manganese acetate tetrahydrate in an amount of 0.03% by mol based on the dicarboxylic acid component by increasing the temperature to 215° C. under a nitrogen atmosphere. After attaining 90% or more of the reaction conversion of the dicarboxylic acid component, antimony (III) oxide in an amount of 0.02% by mol and triethyl phosphate in an amount of 0.06% by mol, both based on the dicarboxylic acid component, were added thereto, and polycondensation was performed by gradually increasing the temperature until finally reaching 250 to 280° C. and gradually decreasing the pressure until finally reaching 0.1 kPa or less. The reaction was terminated when a suitable melt viscosity was obtained, thereby recovering a polyester resin.

The evaluation results are shown in Table 1.

[Production and Evaluation of Optical Lenses]

The polyester resin obtained in each of Examples 1 to 7 and Comparative Examples 1 to 5 and 7 was dried under vacuum at a temperature lower by 20° C. than a glass transition temperature of the polyester resin for 10 h, and then injection-molded using "SH50" available from Sumitomo Heavy Industries, Ltd., at a cylinder temperature of 260° C. and a mold temperature lower by 35° C. than the glass transition temperature of the polyester resin, thereby obtaining a biconvex lens having a diameter of 28 mm and a curvature radius of 20 mm for both convex surfaces. The evaluation results are shown in Table 1.

[Evaluation of Moldability]

The polyester resin obtained in each of Example 4 and Comparative Example 2 was dried under vacuum at a temperature lower by 20° C. than a glass transition temperature of the polyester resin for 8 h, and then injection-molded using "SH50" available from Sumitomo Heavy Industries, Ltd., at a cylinder temperature, a mold temperature and a dwell pressure as shown in Table 2 by controlling an injection speed of the polyester resin to 1, 5, 10, 20 and 30 (mm/s). The number of failures occurring upon repeated molding operations, such as break of molded pieces and sticking to the mold, per the number of the molding operations was defined as a molding defect frequency of the polyester resin. The evaluation results are shown in Table 2.

As shown in Table 1, the polyester resins obtained in Examples 1 to 7 were materials having a low Abbe number and a good appearance and further exhibited a long half crystallization time, a good thermal stability and an excellent moldability as compared to those obtained in Comparative Examples 1 to 5 and 7. In Comparative Example 6, no copolymerization of the raw materials was caused. As shown in Table 2, the polyester resin obtained in Comparative Example 2 exhibited a high molding defect frequency as compared to that obtained in Example 4. The reason therefor is considered to be that the high injection speed of the polyester resin caused increase in frictional heat and therefore induced thermal decomposition of the polyester resin having a poor thermal stability, which resulted in occurrence of the molding defects.

TABLE 1

|  |  | Examples | | | | | | |
| --- | --- | --- | --- | --- | --- | --- | --- | --- |
|  |  | 1 | 2 | 3 | 4 | 5 | 6 | 7 |
| Amount of monomer charged (mol) | | | | | | | | |
| Dicarboxylic acid component | NDCM | 0.953 | 0.953 | 0.953 | 0.953 | 0.811 | 0.922 | 0.953 |
|  | DMT |  |  |  |  | 0.09 | 0.102 |  |
| Diol component | TCDDM | 0.143 | 0.286 | 0.191 | 0.095 | 0.27 | 0.051 |  |
|  | PCPDM |  |  |  |  |  |  | 0.143 |
|  | SPG |  |  |  |  |  |  |  |
|  | MPO |  |  |  |  |  |  |  |
|  | NPG |  |  |  |  |  |  |  |
|  | CHDM |  |  |  |  |  |  |  |
|  | BPA |  |  |  |  |  |  |  |
|  | EG | 1.572 | 1.429 | 1.524 | 1.620 | 1.351 | 1.793 | 1.572 |
| Evaluation results of polyester resin | | | | | | | | |
| Copolymer composition (% by mol) | NDCM | 100 | 100 | 100 | 100 | 90 | 90 | 100 |
|  | DMT |  |  |  |  | 10 | 10 |  |
|  | TCDDM | 15 | 30 | 20 | 10 | 5 | 30 |  |
|  | PCPDM |  |  |  |  |  |  | 15 |
|  | SPG |  |  |  |  |  |  |  |
|  | MPO |  |  |  |  |  |  |  |
|  | NPG |  |  |  |  |  |  |  |
|  | CHDM |  |  |  |  |  |  |  |
|  | EG | 85 | 70 | 80 | 90 | 95 | 70 | 85 |
| Tg (° C.) | | 124 | 128 | 125 | 124 | 123 | 124 | 135 |
| IV (dL/g) | | 0.38 | 0.42 | 0.40 | 0.41 | 0.49 | 0.48 | 0.41 |
| Refractive index | | 1.637 | 1.632 | 1.638 | 1.640 | 1.639 | 1.626 | 1.636 |
| Abbe number | | 19 | 20 | 19 | 19 | 19 | 21 | 20 |
| Half crystallization time (min) | | 178 | >180 | >180 | 74 | 31 | >180 | >180 |
| Evaluation results of optical lens | | | | | | | | |
| Appearance | | Good | Good | Good | Good | Good | Good | Good |

|  |  | Comparative Examples | | | | | | |
| --- | --- | --- | --- | --- | --- | --- | --- | --- |
|  |  | 1 | 2 | 3 | 4 | 5 | 6 | 7 |
| Amount of monomer charged (mol) | | | | | | | | |
| Dicarboxylic acid component | NDCM | 0.953 | 0.938 | 0.953 | 0.953 | 0.953 | 0.953 | 0.808 |
|  | DMT |  |  |  |  |  |  |  |
| Diol component | TCDDM |  |  |  |  |  |  | 0.404 |
|  | PCPDM |  |  |  |  |  |  |  |
|  | SPG |  | 0.094 |  |  |  |  |  |
|  | MPO |  |  | 0.191 |  |  |  |  |
|  | NPG |  |  |  | 0.191 |  |  |  |
|  | CHDM |  |  |  |  | 0.143 |  |  |
|  | BPA |  |  |  |  |  | 0.162 |  |
|  | EG | 1.715 | 1.595 | 1.524 | 1.524 | 1.572 | 1.553 | 1.051 |
| Evaluation results of polyester resin | | | | | | | | |
| Copolymer composition (% by mol) | NDCM | 100 | 100 | 100 | 100 | 100 | Not copolymerized | 100 |
|  | DMT |  |  |  |  |  |  |  |
|  | TCDDM | 0 |  |  |  |  |  | 49 |
|  | PCPDM |  |  |  |  |  |  |  |
|  | SPG |  | 10 |  |  |  |  |  |
|  | MPO |  |  | 15 |  |  |  |  |
|  | NPG |  |  |  | 15 |  |  |  |
|  | CHDM |  |  |  |  | 12 |  |  |
|  | EG | 100 | 90 | 85 | 85 | 88 |  | 51 |
| Tg (° C.) | | 124 | 124 | 116 | 120 | 122 |  | 134 |
| IV (dL/g) | | 0.55 | 0.39 | 0.5 | 0.51 | 0.46 |  | 0.48 |
| Refractive index | | 1.649 | 1.629 | 1.643 | 1.640 | 1.641 |  | 1.623 |
| Abbe number | | 65 | 19 | 19 | 19 | 19 |  | 22 |
| Half crystallization time (min) | | 1 | 94 | 12 | 21 | 8 |  | >180 |
| Evaluation results of optical lens | | | | | | | | |
| Appearance | | Whitened | Good | Clouded | Clouded | Clouded |  | Good |

The abbreviations used in Table 1 have the following meanings.

NDCM: Dimethyl 2,6-naphthalenedicarboxylate (available from Mitsubishi Gas Chemical Co., Inc.)
DMT: Dimethyl terephthalate (available from Showa Chemical Co., Ltd.)
TCDDM: Tricyclodecane dimethanol represented by the formula (i) (available from OXEA Japan K.K.)
PCPDM: (Pentacyclopentadecane dimethanol: synthesized by referring to a synthesis method described in JP 4431844)
SPG: 3,9-Bis-(1,1-dimethyl-2-hydroxyethyl)-2,4,8,10-tetraoxaspiro[5.5]undecane (available from Mitsubishi Gas Chemical Co., Inc.)
EG: Ethylene glycol (available from Maruzen Petrochemical Corp.)
MPO: 2-Methyl-1,3-propanediol (available from Maruzen Petrochemical Corp.)
NPG: Neopentyl glycol (available from Mitsubishi Gas Chemical Co., Inc.)
CHDM: 1,4-Cyclohexane dimethanol (available from Sigma-Aldrich Japan K.K.)
BPA: 4,4'-Isopropylidene diphenol (available from Sigma-Aldrich Japan K.K.)

TABLE 2

| Materials | Example 4 | Comparative Example 2 |
|---|---|---|
| Cylinder temperature (° C.) | 280 | |
| Mold temperature as actually measured (° C.) | 104 | 105 |
| Dwell pressure (MPa; sec) | 80 | 80 |
| Injection speed (mm/s) | Mold release defect frequency | |
| 1 | 0/30 | 0/30 |
| 5 | 0/30 | 0/30 |
| 10 | 0/30 | 0/30 |
| 20 | 0/30 | 4/20 |
| 30 | 0/30 | 4/20 |

INDUSTRIAL APPLICABILITY

The polyester resin of the present invention has a high thermal stability and an excellent moldability, and is capable of providing an optical lens having a low Abbe number and a high refractive index. Therefore, the polyester resin of the present invention is considerably useful in the application fields where an expensive high refractive index glass lens has been used, such as a camera, a telescope, binoculars and a television projector. Furthermore, the optical lens of the present invention is useful as an aspherical lens having a high refractive index and a low birefringence, in particular, as a concave lens for chromatic aberration correction.

The invention claimed is:

1. A polyester resin comprising a diol constitutional unit and a dicarboxylic acid constitutional unit as main constitutional units, the diol constitutional unit containing from 70 to 95% by mol of a constitutional unit derived from ethylene glycol and from 5 to 30% by mol of a constitutional unit derived from tricyclodecane dimethanol or pentacyclopentadecane dimethanol, and the dicarboxylic acid constitutional unit containing 50% by mol or more of a constitutional unit derived from a naphthalenedicarboxylic acid.

2. The polyester resin according to claim 1, wherein the naphthalenedicarboxylic acid is 2,6-naphthalenedicarboxylic acid.

3. The polyester resin according to claim 1, wherein the dicarboxylic acid constitutional unit contains 90% by mol or more of the constitutional unit derived from a naphthalenedicarboxylic acid.

4. The polyester resin according to claim 1, wherein the constitutional unit derived from tricyclodecane dimethanol or pentacyclopentadecane dimethanol is a constitutional unit derived from tricyclodecane dimethanol.

5. The polyester resin according to claim 4, wherein the diol constitutional unit contains from 5 to 20% by mol of the constitutional unit derived from tricyclodecane dimethanol.

6. The polyester resin according to claim 4, wherein the diol constitutional unit contains from 10 to 15% by mol of the constitutional unit derived from tricyclodecane dimethanol.

7. The polyester resin according to claim 1, wherein the polyester resin has the following properties (1) and (2):
(1) a mid-point glass transition temperature of 120° C. or higher as measured by a method for measuring a transition temperature of plastics according to JIS K7121; and
(2) an intrinsic viscosity (IV) of from 0.2 to 1.0 dL/g as measured at 25° C. in a mixed solvent containing phenol and 1,1,2,2-tetrachloroethane at a mass ratio of 6:4.

8. An optical lens obtained by molding the polyester resin as defined in claim 1.

9. The optical lens according to claim 8, wherein the optical lens has a refractive index of 1.60 or more and an Abbe number of 21 or less as measured with respect to a test piece formed by annealing a molded piece of the polyester resin at a temperature lower by about 20° C. than a glass transition temperature of the polyester resin for 10 h.

10. The optical lens according to claim 9, wherein the optical lens is an aspherical lens.

11. The optical lens according to claim 9, wherein the optical lens is a lens for a camera.

12. An optical lens system comprising a combination of the optical lens as defined in claim 8, and another optical lens.

13. An optical lens system comprising a combination of the optical lens as defined in claim 9, and another optical lens.

14. An optical lens system comprising a combination of the optical lens as defined in claim 10, and another optical lens.

15. An optical lens system comprising a combination of the optical lens as defined in claim 11, and another optical lens.

* * * * *